United States Patent
Neville et al.

(10) Patent No.: US 8,401,334 B2
(45) Date of Patent: Mar. 19, 2013

(54) METHOD, SYSTEM AND APPARATUS FOR MEDIA CUSTOMIZATION

(75) Inventors: William Kennedy Neville, Oak Park, CA (US); Donald Kravits, Los Angeles, CA (US); Barbara Ann Groth, Los Angeles, CA (US); Maya Cohan, Venice, CA (US); Jason Andrew Carpenter, Santa Monica, CA (US); Michael Andrew Carpenter, Santa Monica, CA (US); Robert Rindfuss, Orlando, FL (US); Lars Erich Norpchen, Pacifica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1036 days.

(21) Appl. No.: 12/340,461

(22) Filed: Dec. 19, 2008

(65) Prior Publication Data
US 2010/0158380 A1 Jun. 24, 2010

(51) Int. Cl.
G06K 9/36 (2006.01)

(52) U.S. Cl. .................................................. 382/284

(58) Field of Classification Search ................ 345/620, 345/624; 382/190, 284
See application file for complete search history.

(56) References Cited

U.S. PATENT DOCUMENTS

| | | | |
|---|---|---|---|
| 5,623,587 A | 4/1997 | Bulman | |
| 5,946,444 A * | 8/1999 | Evans et al. | 386/200 |
| 6,351,265 B1 | 2/2002 | Bulman | |
| 6,526,158 B1 * | 2/2003 | Goldberg | 382/115 |
| 6,710,775 B1 | 3/2004 | Tulman | |
| 6,892,388 B1 * | 5/2005 | Catanoso | 725/105 |
| 7,362,919 B2 | 4/2008 | Das et al. | |
| 7,921,036 B1 * | 4/2011 | Sharma et al. | 705/14.66 |
| 2002/0114522 A1 * | 8/2002 | Seeber | 382/218 |
| 2003/0001846 A1 | 1/2003 | Davis et al. | |
| 2003/0051255 A1 | 3/2003 | Bulman et al. | |
| 2003/0078837 A1 | 4/2003 | Lo et al. | |
| 2003/0105667 A1 | 6/2003 | Millikan | |
| 2003/0189589 A1 | 10/2003 | LeBlanc et al. | |
| 2005/0043897 A1 | 2/2005 | Meyer | |
| 2006/0187305 A1 * | 8/2006 | Trivedi et al. | 348/169 |
| 2006/0200745 A1 * | 9/2006 | Furmanski et al. | 715/500.1 |
| 2007/0121957 A1 | 5/2007 | Trowbridge et al. | |
| 2007/0136454 A1 | 6/2007 | Spiridellis et al. | |
| 2008/0158230 A1 | 7/2008 | Sharma et al. | |
| 2008/0163317 A1 | 7/2008 | Mills | |
| 2008/0165195 A1 | 7/2008 | Rosenberg | |
| 2008/0208974 A1 | 8/2008 | Belimpasakis | |
| 2008/0215964 A1 | 9/2008 | Abrams et al. | |
| 2008/0215965 A1 | 9/2008 | Abrams et al. | |
| 2008/0247650 A1 * | 10/2008 | Amir et al. | 382/209 |

(Continued)

OTHER PUBLICATIONS

Author Unknown, "About Flickr", http://www.flickr.com/about/, 2 pages, at least as early as Sep. 18, 2008.

(Continued)

*Primary Examiner* — Gregory F Cunningham
(74) *Attorney, Agent, or Firm* — Dorsey & Whitney LLP

(57) ABSTRACT

A method for customizing media is provided. The method comprises obtaining an image including at least one image of a portion of a person. The method further comprises extracting the at least one image of a portion of a person from the image based on object finding and generating customized media including the at least one image of a portion of a person extracted from the scene image. An amusement park attraction is also disclosed.

18 Claims, 10 Drawing Sheets

U.S. PATENT DOCUMENTS

2009/0151741 A1* 6/2009 Ngo .............................. 132/216

OTHER PUBLICATIONS

Author Unknown, "About JibJab", http://sendables.jibjab.com/about, 6 pages, at least as early as Sep. 18, 2008.

Author Unknown, "Face Finding", http://www.research.ibm.com/ecvg/jhc_proj/faces.html, 3 pages, at least as early as Jun. 12, 2002.

Author Unknown, "FSE (Face Sensing Engine)", http://www.oki.com/en/fse/, 3 pages, at least as early as Dec. 10, 2008.

Author Unknown, "Google Image Search", http://www.google.com/imghp?hl=en, 2 pages, at least as early as Sep. 18, 2008.

Author Unknown, "Sendables eCards", http://sendables.jibjab.com, 7 pages, at least as early as Sep. 18, 2008.

Author Unknown, "Starring You!", http://sendables.jibjab/com/category/starring_you, 6 pages, at least as early as Sep. 18, 2008.

Author Unknown, "JokeBox", http://www.jibjab.com/jokebox, 5 pages, at least as early as Sep. 18, 2008.

Author Unknown, "The Real-Time Face Tracking Toolkit for Developers and OEMs", http://www.seeingmachines.com/faceAPI.html?_kk=face%20findings&_kt=32c5c439-e14..., 2 pages, at least as early as Dec. 10, 2008.

Beaver, John, "Elf Yourself", http://jayisgames.com/archives/2006/12/elf_yourself.php, 6 pages, Dec. 24, 2006.

Frischholz, Robert, Dr., "Face Detection", http://www.facedetection.com/, 2 pages, Feb. 15, 1999.

Gorell, Robert, "How to Elf Yourself Out of Millions", http://www.grokdotcom.com/2008/02/08/elf-yourself-campaign/, 11 pages, Feb. 8, 2008.

* cited by examiner

METHOD, SYSTEM AND APPARATUS FOR MEDIA CUSTOMIZATION

SCOPE OF THE INVENTION

The present invention relates to methods, systems, and apparatus for customizing media.

BACKGROUND

Media objects, such as movies, videos, static displays, audio and the like, are well known forms of entertainment. Media objects are used in a wide variety of settings for a variety of purposes.

In an amusement park attraction media is a particularly useful tool. Often times, an amusement park attraction will use a media object to memorialize an experience for an individual, such as by taking a picture of that person on a ride. Traditionally, an image may be created for a guest or person from a ride by obtaining an image of an entire ride vehicle which often includes several individuals, more than one of which may be a stranger to a particular guest. Thus, the photo obtained, which often may be purchased by the guest, includes many unwanted elements and people. Some attractions include having an individual guest stand in front of a green screen. A camera is then manually moved or the individual's head is moved until a face is displayed in a stationary on-screen window in, for example, a kiosk staffed by an operator. The photo is taken and oval cut-out with the individual's head is removed from the green screen. This process is both cumbersome and inexact. Moreover, a guest desiring to use one of the foregoing images may often be burdened with the task of reviewing multiple images displayed on many screens to identify oneself, and further may be required to remember a picture ID number.

The internet is also a common media outlet. Many online services and websites are available for sharing media objects. Such services, for example, permit sharing of photographs, video clips, audio clips, and other media objects. Typically, such sites permit a user to upload a media object, whether sourced from a digital source or obtained from a hard copy which has been transposed into digital form, so that others can view, listen to or watch the media object, as well as engage in commentary or conversations regarding the media object.

Techniques for merging media objects, such as a set of images or image representations into a composite have also been explored. For example, systems have been used for producing pictures of human subjects with the head of one person superimposed upon the body of another person, or animal, etc. Superposition is normally accomplished mechanically by cutting around the outline of the head of a person, or electronically tracing around the head, in a first photograph and applying or superimposing the cutout head to a body in a second photograph. This produces a third photograph or electronic image. The superimposed image may also be animated or included in an animation, as has been done in recent years by, for instance, JibJab Media, Inc. These animations often include a static image of a head of a person superimposed on a body in an online animated video clip. The face or image used may be uploaded similar to the online services used for sharing media objects discussed above.

Face finding, facial recognition and image capture are used for a variety of purposes from security to entertainment. Face finding involves detecting a human face or faces in an image, such as a digital image and culling it out. Facial recognition may take a face and compare it to a database of other faces to pick the face from the database. Facial recognition may be used to recognize an individual's face in an image by comparison to a database of images or facefinding or faces. A computer system executes, facial recognition software to capture a user's face.

To date, however, pairing a face finding process, with other techniques such as superimposition to customize a media object for a person has not been accomplished. Accordingly, a method and system for customizing a media object using object finding is provided. Moreover, a customized process as described that may be further personalized by collecting personal information from an individual and using that information to further personalize the media element is also provided.

SUMMARY

A method for customizing media is disclosed. The method comprises obtaining a scene image including at least one image of a portion of a person. The method further comprises extracting the at least one image of a portion of a person from the scene image based on object finding and generating customized media including the at least one image of a portion of a person extracted from the scene image.

An amusement park attraction is also provided. The attraction includes at least one ride vehicle configured to seat one or more guests. The at least one ride vehicle includes at least one first computing device with a display. The attraction also includes an imaging device positioned to capture at least one image of the at least one or more guests. The at least one first computing device is configured to display customized media comprising a stock media altered to include the at least one guest image.

The system and amusement park attraction described herein may be used to generate a personalized experience and a personalized media object for the guest, and may be done without obtaining any information from or about the guest. The system also permits and provides a means for customization by the guest. The method and systems, as well as the amusement park attraction, described herein provide a significant enhancement to the guest experience at an attraction. They provide a personal connection to at least a portion of the ride by injecting a guest image and metadata related to the guest into a portion of the attraction. In addition, the method focuses the attention of the guest on the attraction, by requiring the input from the guest and generating a response or media including the guest. Moreover, the media object can be used to provide guest entertainment during, for example, transitions of the ride which may otherwise not maintain the attention of the guest. Other advantages and features may become apparent from the following description, drawings, and claims.

DETAILED DESCRIPTION

The invention is generally directed to method and system for customizing media. Generally, the method includes obtaining an raw image or scene image which may include a person or a portion of a person. An image including at least a portion of the person in the raw image is extracted from the raw image. A customized media object may then be created including the extracted image.

Figure 1:
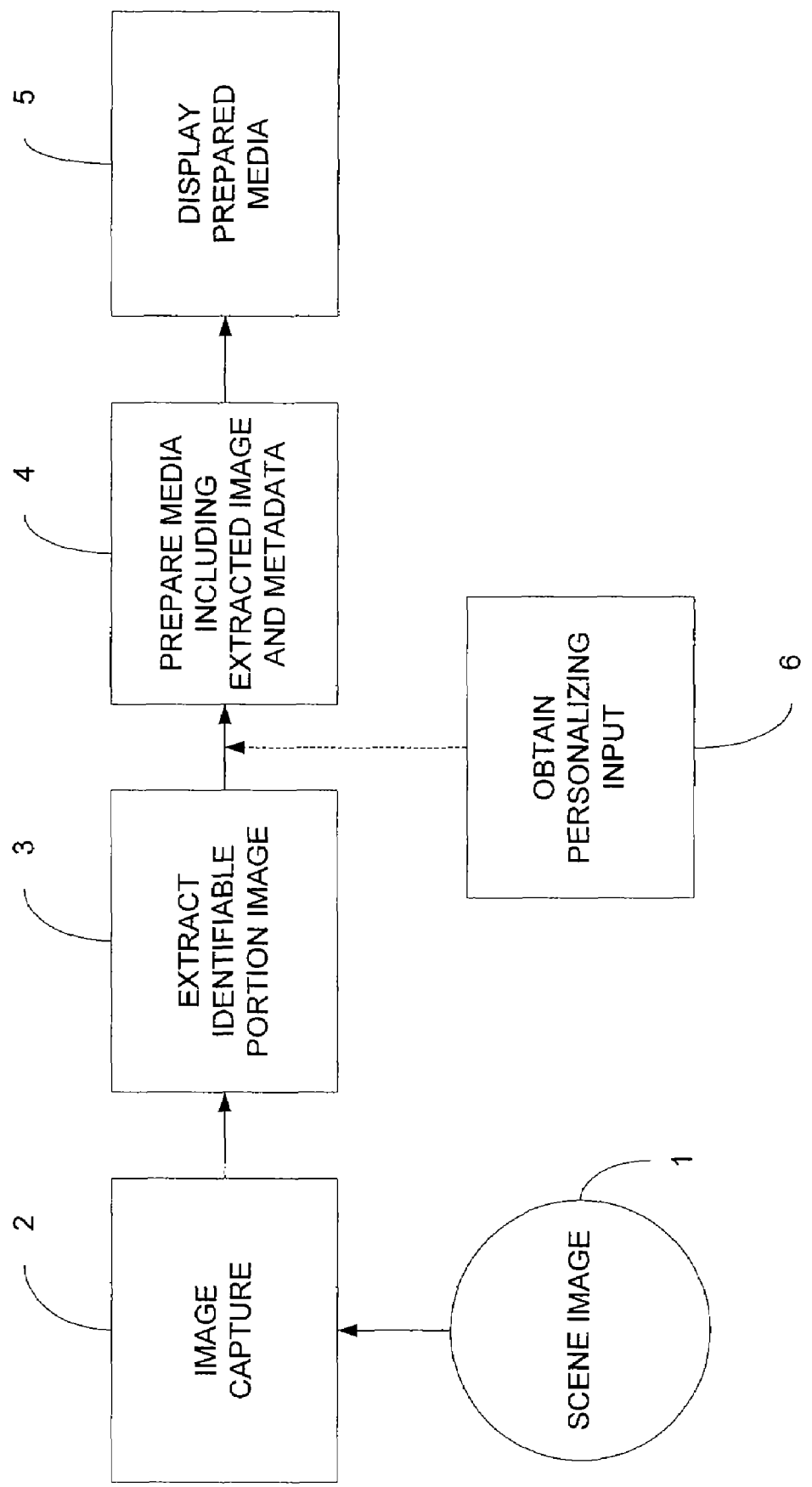
FIG. 1 is a general process flow chart illustrating a method for customizing media.

One particular method, as illustrated by reference to FIG. 1, includes, among other features, obtaining a scene image 1 including at least one image of a portion of a person 2. The method further comprises extracting the at least one image of a portion of a person from the scene image based on object finding 3 and generating customized media including the at least one image of a portion of a person extracted from the scene image 4. That media may then be displayed 5. The media may be further optionally personalized by adding input from a person 6.

A scene image 1 may be obtained, as referenced above, by any suitable mechanism, and in one particular method by capturing the image using an image capture device, such as but not limited to, by taking a picture using a digital camera or recording a video segment using a video camera. The scene image may have an image of a person therein. At least one image of a portion of a person from the scene image may be extracted based upon object finding 3. For example, object finding may be accomplished by detection of features, such as a human face, in an image containing several features or objects. The detection may be accomplished by use or assistance of software operating a computer method designed for this purpose. Object recognition is also contemplated. For example, object recognition may be accomplished by comparing selected facial features from the scene image and a database which may include additional images by comparison of the images. Finding and recognition computer methods may be used identify faces by extracting landmarks, or features, from an image of a subject's face. Object finding as used herein may be any technology capable of or adapted to locate or detect an identifying feature in an image. An example of object finding may be face finding, in which a face may be the identifying feature in an image of a person that is detected.

Media may be customized by any suitable mechanism. In one example, media is customized by a computer system which inserts an identifiable portion of a person into a stock media object.

The system and method described herein is adapted for use in association with a guest engagement or interaction assembly or device; in other words, a device that provides a level of interaction with a person. The guest engagement assembly or device in the examples described herein is an amusement park attraction or ride, but any suitable device for interacting with a guest or person may be suitable for the purposes of the present invention. The amusement park attraction described herein includes a ride 10 having one or more passenger locations or seats 12 (see FIG. 2). The seats 12 may be included in one or more ride vehicles 10 or cars. The vehicles may be adapted for movement or may be stationary. An on-board computer system may be operably connected or may be mounted in one or more locations on the ride vehicle 10 for guest interaction and display of media objects. More specifically, a ride vehicle 10 may have an on-board computer system 14 or a plurality of on-board systems. A display 16 may be provided in communication with the computer system 14 and may be integral therewith. The display 16 may be adapted to display or render a media object, including, but not limited to a static display, a video or movie, or combination of the foregoing for viewing by a guest. In one example, the display is located on the guest engagement assembly or device and includes an integrated user interface or user input device 34. A trigger board 24 (see FIG. 3) located or provided in association with a guest interaction device 28 may be adapted to trigger an event. The computer and/or trigger board 24 may be housed on or in the guest interaction device body 28. In one example, the trigger board 24 may be adapted to signal the image capture computer 12 to capture or obtain an image by proximity between two pre-defined positions. More specifically, the guest interaction device 28 having a first triggering element may be moveable or may be positioned on a moveable object, such as, but not limited to a ride vehicle 10, while a second triggering element may be stationary. A triggering element may be manual or electronic device arranged to activate a linked system or send a signal or other communication to a particular system to engage that system upon the occurrence of a pre-defined event, such as but not limited to the passage of a period of time, or the location of a moving object. Examples of suitable triggering elements include, but are not limited to a manual trigger, such as a switch that is activated when a moving object passes over it, or a sensor, such as a pressure sensor or motion sensor which is activated upon sensing that the monitored activity has occurred, a device operated by time delay. Upon reaching a predefined distance between the first and second triggering elements, the image capture device 26 may be triggered to obtain an image. The trigger board 24 may also be adapted to trigger the delivery of a media object to the guest interaction device 28 computer. To this end, the trigger board 24 may include a screen or display identification which signals the identity of the particular display to the network system. In one or more examples, the image capture computer system 18 may be arranged to receive a trigger or communication of a triggering event. For example, as shown in FIG. 3, a triggering event may occur by sending a signal via a digital 10 or input output device to the image capture computer system 18. The system may communicate through a digital 10 device 30 with a bill board 32 and image capture device 26 to obtain one or more raw images of a guest which may be transferred or communicated to the image capture computer 18. In one example of an embodiment the bill board 32 is used to attract the attention of a guest, thereby causing the guest to look in the desired direction to capture an image. For example a video screen may be placed below an image captive device or camera.

An additional or alternative guest engagement device may be a kiosk (not shown). The kiosk may be provided with a computer system including a user input device 34. The kiosk computer system may be in communication with one or more of the systems described herein. The computer system may further be provided with an image capture device 26 in communication with the computer system or network and may be adapted for object recognition. For example, the kiosk may capture and image of a person, such as an image of a face, and compare that image to a database of images so as to recognize and associate an image of a person with other data which may be stored in the computer system.

In the system for customizing media described herein, a computer system or first computer system may be provided. The first computer system may be an image capture computer system 18. The image capture computer system, in one or more examples described herein, is provided with or in communication with an image capture device 26. The image capture computer system is arranged for obtaining an image of a person or guest. The first computer system may also be provided in association or communication with one or more of a server, a display, and/or a user input device 34. The first computer system executes software and may also be provided with a communication device in communication with a network. The first computer system may further be operatively linked or provided in communication with a database or other mass storage system or device where the captured image, processed image, and any other data is stored. A plurality of first computer systems or components thereof may be provided in one or more examples of embodiments of the present invention.

In examples of embodiments described, and as shown in FIG. 3, the image capture computer system 18 is in operable communication with an object finding server 20, each of which may be provided with executable software and/or other system components capable of comparing, identifying, cropping, reducing, cutting, or otherwise modifying an image obtained by an image capture device 26. In addition, the object finding server 20 and/or a network server 22 may be provided with executable software and/or other system components to assemble a final image from a combination of one or more images.

A single computer system may be used, or multiple integrally related systems may be used. For example, a second computer system may also be provided in communication with the first computer system. The second computer system may be a network server system 22. The network computer or server system may be provided for processing and storage of an image received from the image capture computer system and the object finding server and may also be adapted to facilitate transfer of data and images between a guest interaction device computer system 14, and the image capture system 16. The second computer system executes software and may be provided in association or communication with one or more of a server, a display, and/or a user input device 34, or a plurality of one or more of the foregoing devices. The second computer system may be provided with a communication device as described herein in communication with a network, which may be a wireless communication device or hardwired communication device. The second computer system may also be operatively linked or provided in association with or in communication with a database or other mass storage system or device. The second computer system may be an "off-board" system. In other words, the second computer system may be located separate from a guest engagement or interaction device 28 and/or ride vehicle 10.

A third computer system may further be provided including any one or more of the components described with respect to the first and second computer systems. The third computer system may be an "on-board" system, such as a guest interaction device computer system 14 or a ride vehicle computer system either of which may be remote from the first and second computer systems. To this end, the guest interaction device 28 in one or more examples of embodiments of the system for customizing media may be operably connected to the network server 22 for communication therebetween via a wireless network.

While first, second, and third computer systems are specifically described, any number of computer systems may also be provided in communication with the various components described herein without departing from the overall scope of the present invention. Moreover, the computer systems may be linked in any number of ways, including but not limited to direct connection, remote connection, wireless connection or any combination thereof.

One or more terminals, such as a kiosk, or other guest interaction device 28, may also be used in connection with a network, hardwired or wireless, for handling the relevant communications. The kiosk or guest interaction device 28 may include an image capture device and may be provided in communication with an object recognition server and database. The device may execute software for recognizing an image. For example, the kiosk may be adapted to capture an image, such as by taking a picture of a person's face, and comparing that captured image to a database of faces or images so as to link the captured image and data which may be associated with the person's image in the database.

As set forth above, a communication device may be provided with each or any of the computer systems described herein. To this end, each computer system may include executable software to maintain and/or control the functions of the present invention, including the communication and transmission of data between the various components and devices of the present invention. One or more communication links and/or devices may be provided to transmit and receive signals between two or more devices. The communication link may be a high-speed network connection. Additionally, the computer may include a means for transforming a signal received into a visual and/or audio signal on the display screen or GUI. A wireless communication device may be provided and may comprise any device capable of transmitting and receiving data or files. A single wireless device may be used, or a combination of such devices may be used without departing from the overall scope of the present invention. In one example, a Wi-Fi system may be employed. In another example, a satellite or communication link to a satellite may be provided in communication with the system and/or one or more of its various components. One or more switches, routers, satellite dishes and the like may be provided for communication. A computer may therefore comprise a wireless transmission device or a wireless receiver device, or both. While wireless communication is described, it is contemplated that a physically linked communication system may be used for communication between one or more computers or a portion of the communication system may include a physical communication link. Examples of a physical communication devices or links may be a cable, Ethernet, or other hardwired connection.

As shown in FIG. 3, the image capture computer system 18 may be in operable communication with the object recognition server 20, and may also be in operable communication with the network server 22. The object finding server 20 may also be in communication with a network server 22. One or more guest interaction devices 28 may also be operatively linked or otherwise in communication with the computer systems 18, 20, 22. In one example, a plurality of guest interaction devices 28 are provided in communication with the network server 22. These guest interaction devices 28, as discussed above, may include a computer system 14, as well as an optional trigger board 24 or mechanism in operable communication or connection with the guest interaction computer system and/or the network server 22 system.

The image capture device 26, such as but not limited to a digital camera or other image capture mechanism, may be provided in communication with any one or more of the computer systems. As described, the image capture device 26 may be provided in operable communication with the image capture computer system 18 and may also be in operable communication with the object finding server 20, as well as an object recognition server or database. The image capture device 26 forms a first image capture device for capturing an image of a guest. A second image capture device or camera may also be provided in operable communication with a computer system. Any number of image capture devices may be used without departing from the overall scope of the present invention.

The image capture device 26 is arranged for obtaining and rendering an image. The image capture device 26 may also include a processor or computer, a user input device 34, a display and other common camera or image capture components, as well as a communication mechanism for transferring the image to the image capture computer 18. The image capture device 26 may execute software acceptable to obtain an image of a person, to process an image obtained of a person, and/or to convert an image of a person to an alternative format. For example, a camera may be used to crop and send or transmit or communicate an image. The image capture device 26 may also be adapted to receive a request or trigger to obtain an image.

In one example of an embodiment of the system of customizing a media object, the image capture device 26 is adapted or arranged to capture an image of an identifiable portion of a person or guest. An identifiable portion of a guest may be any portion of the guest and may include, for example, the guest face, a full body, a portion of the body, and more specifically, a portion of the guest that is recognizable, such as a face, an item of clothing or other unique feature. An image including an identifiable portion of a guest may be an image readable by machine. To this end, a machine-readable image, which may also be computer-readable, includes information encoded in a form which can be read, scanned or otherwise sensed by a machine or computer and interpreted by the machine's hardware and/or software. Alternatively, the image may be identified by human identifiable means. In one example, the image is a human identifiable image, or an image of a guest that can be visually identified by that guest. When the image or photo is captured by the image capture device 26, the image capture computer system 18 may tag the photo or image with the metadata entered by the guest or a sequence of data related to the guest. Alternatively, the network server 22 may tag or link the image with the relevant metadata. Metadata, as discussed herein, may also include other relevant data, such as but not limited to, a time stamp, a ride vehicle identifier, a number, a key, a location of the occupant or guest, such as, but not limited to, a seat identification and row identification or other information which can be determined automatically by the image capture computer. The system may, thus, associate metadata with the image for later use. To this end, the metadata, or a portion thereof, may travel with the image as it is transferred through the system of obtaining customized media, or the system may be adapted to retrieve the metadata, or a portion thereof, at a later time in the process. In one example, the system captures both the image and metadata in close temporal proximity.

The image may be a visible light image, such as a photograph. However, any form of image suitable for the purposes provided may be used, such as but not limited to an x-ray photographic image, a black and white or a color photographic image, a video image, a silhouette image, and combinations thereof. In one example, the image may be a digital picture to facilitate ease of data transfer in a computer system, although a film image which is transferred to a computer readable format may also be acceptable for purposes of the present invention. The image may also be three dimensional (3-D), two dimensional (2-D), textured, or otherwise include visual effects. The image may also be modified. For instance, the captured image may be rendered in the form of a cartoon or avatar image, or a compression of an image, although other forms of modification of the image would not depart from the overall scope of the present invention.

As described herein, one or more displays 16 may be associated with the method and system for customizing media. In an example of an embodiment, the display 16 associated with the on-board computer system may be or include a screen for rendering an image to a guest or a plurality of guests. A display 16 may also be associated with the first and/or second computer systems, a kiosk, as well as in a general viewing area. Generally, the display 16 may be or include a graphical user interface 34 (GUI) or a communication means by which an image, communication, media, or the like may be displayed or communicated. The display 16 may comprise any suitable device for rendering an image. Examples of displays include, but are not limited to, a plasma display, an electronic display, such as LCD, LED, CRT, projection, and the like. The displays 16 may be free standing, mounted or secured to a wall, a seat, or other device, or may be mounted as a portion of a larger display.

Figure 2:
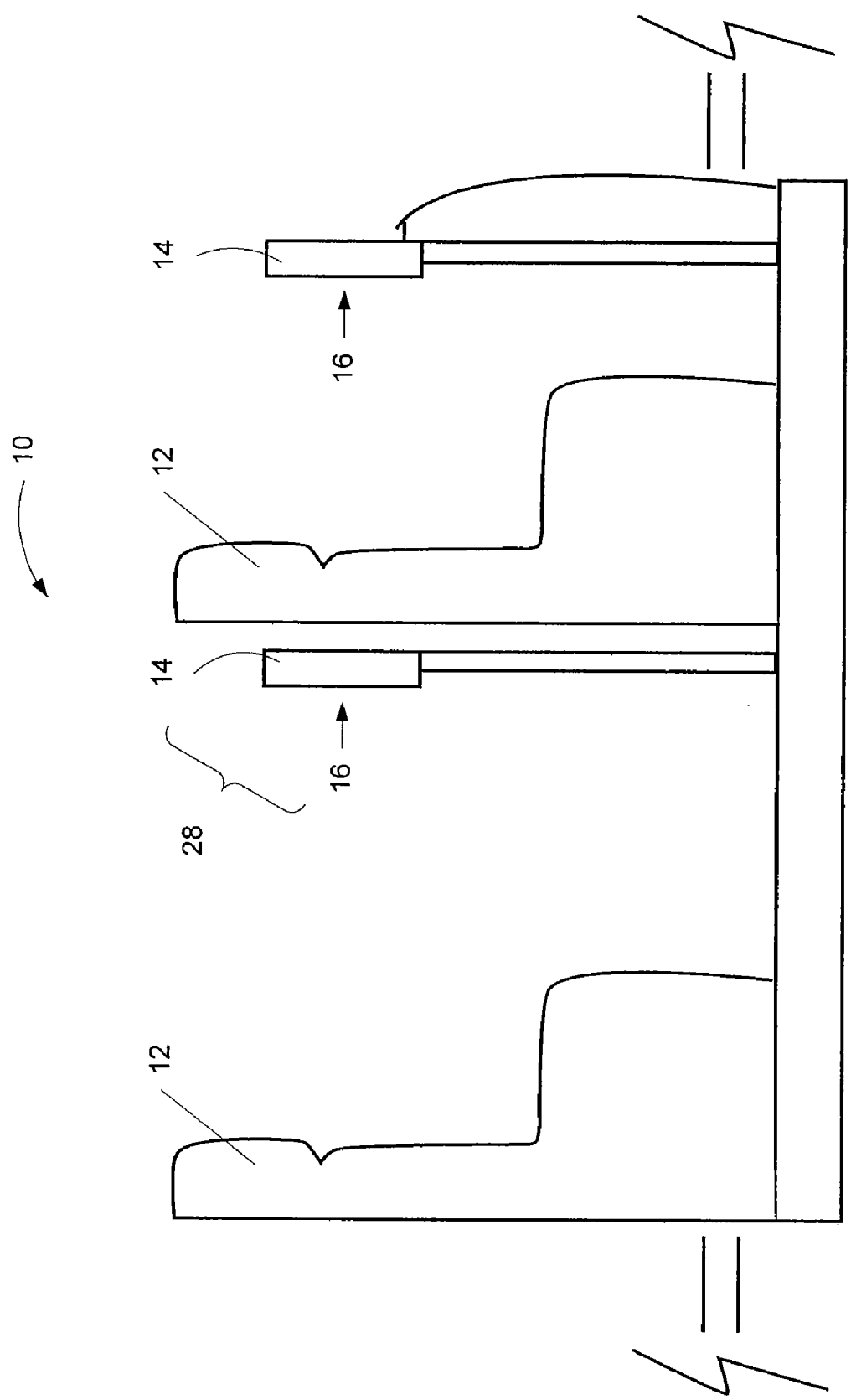
FIG. 2 is a side elevation view of an example of a ride vehicle for use with one or more embodiments of the system and method for customizing media.
Figure 3:
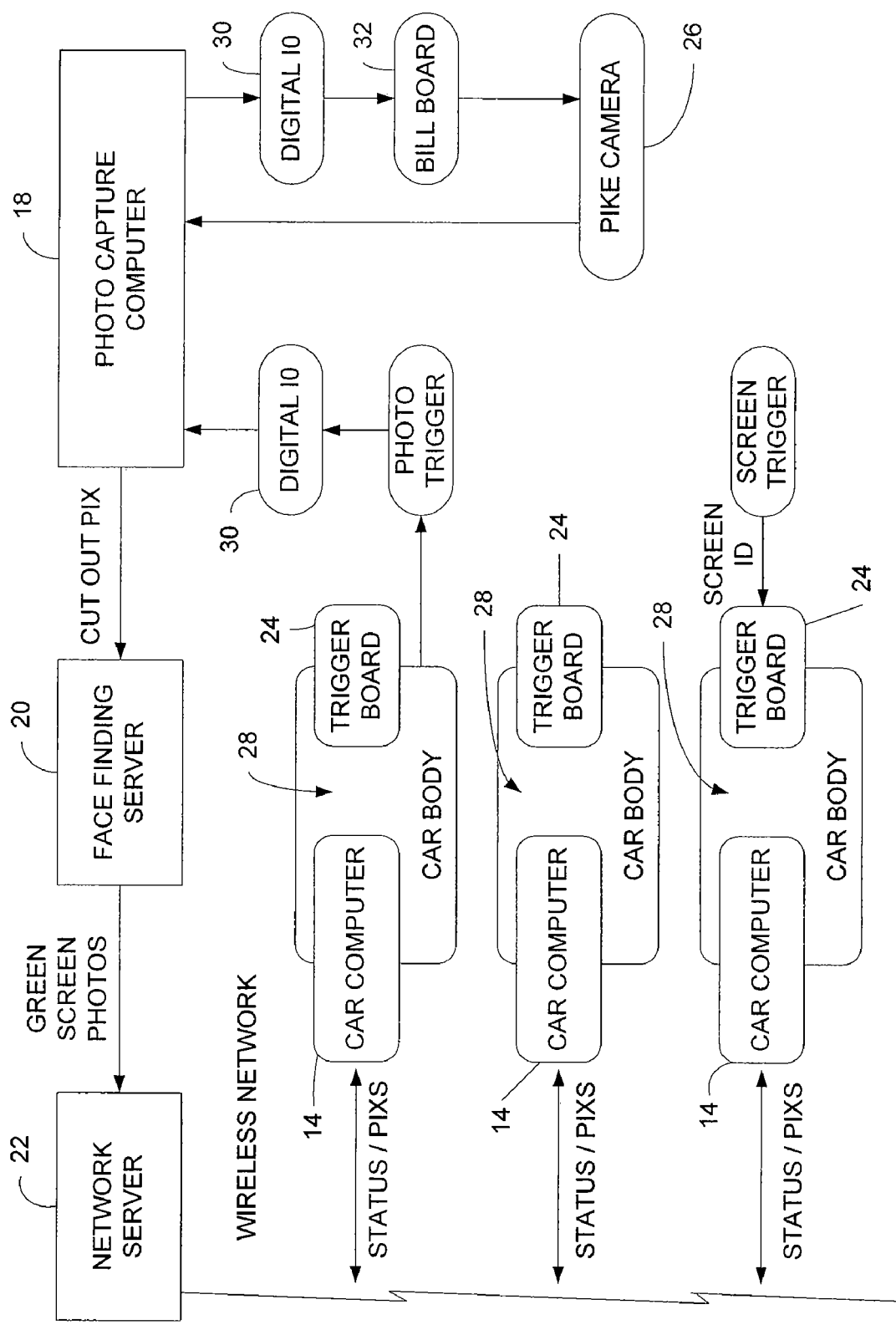
FIG. 3 is system flow chart illustrating a method for customizing media.

More specifically, as seen in FIG. 2 a guest interaction device 28, such as but not limited to a ride vehicle 10 may have one or more displays 16 and one or more computers 14 associated therewith. In one example, a display 16 and computer 14 is provided in association with each seat in the ride vehicle 10. In another example, two guests in a ride vehicle 10 may work together on a single computer and/or to view a single display. The display 16 may be positioned in the field of view of the guest or occupant, and more specifically the seated occupant. To this end, the display 16 may be mounted in a position in front of the seated occupant. The display 16 may be mounted to the seat in front of the occupant, a wall, or may be provided with any other mounting device or frame suitable for holding the display.

Figure 4:
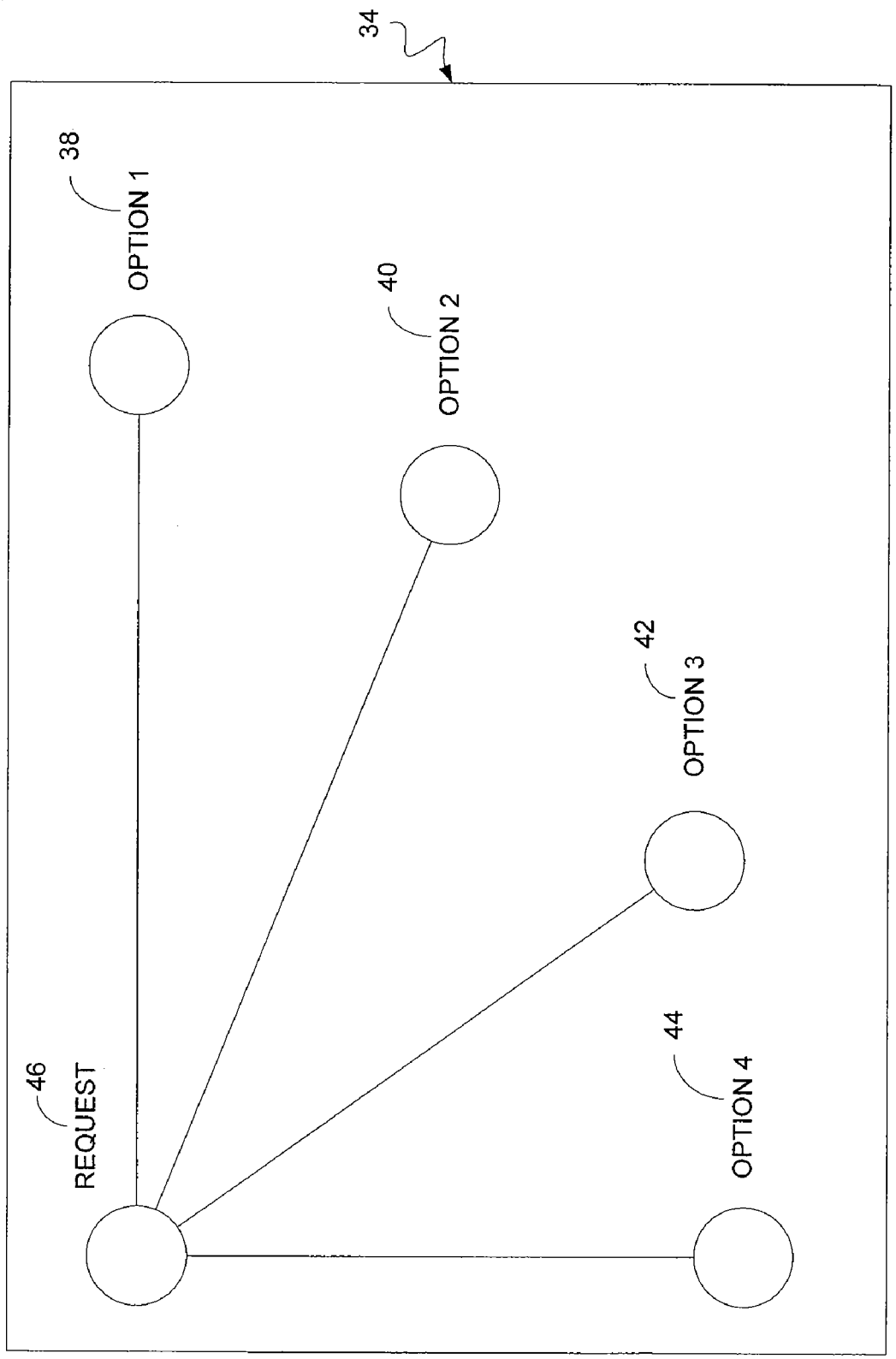
FIG. 4 illustrates an example of a user interface according to one or more embodiments of the present invention, showing a touch screen interface.

As indicated, the display 16 may have a computer 14 in operable communication therewith. The displays or computers may be provided with a user input device 34 to permit a user or guest to communicate with or through the computer, such as for example, a touch screen interface, a controller, a keyboard, and other similar interfaces (see FIG. 4). It is also contemplated that the user interface 34 may employ voice recognition technology and respond to spoken commands. The display or the computer may further be provided in association with a communication device, such that the display can transmit and/or receive signals from a second device.

Figure 5:
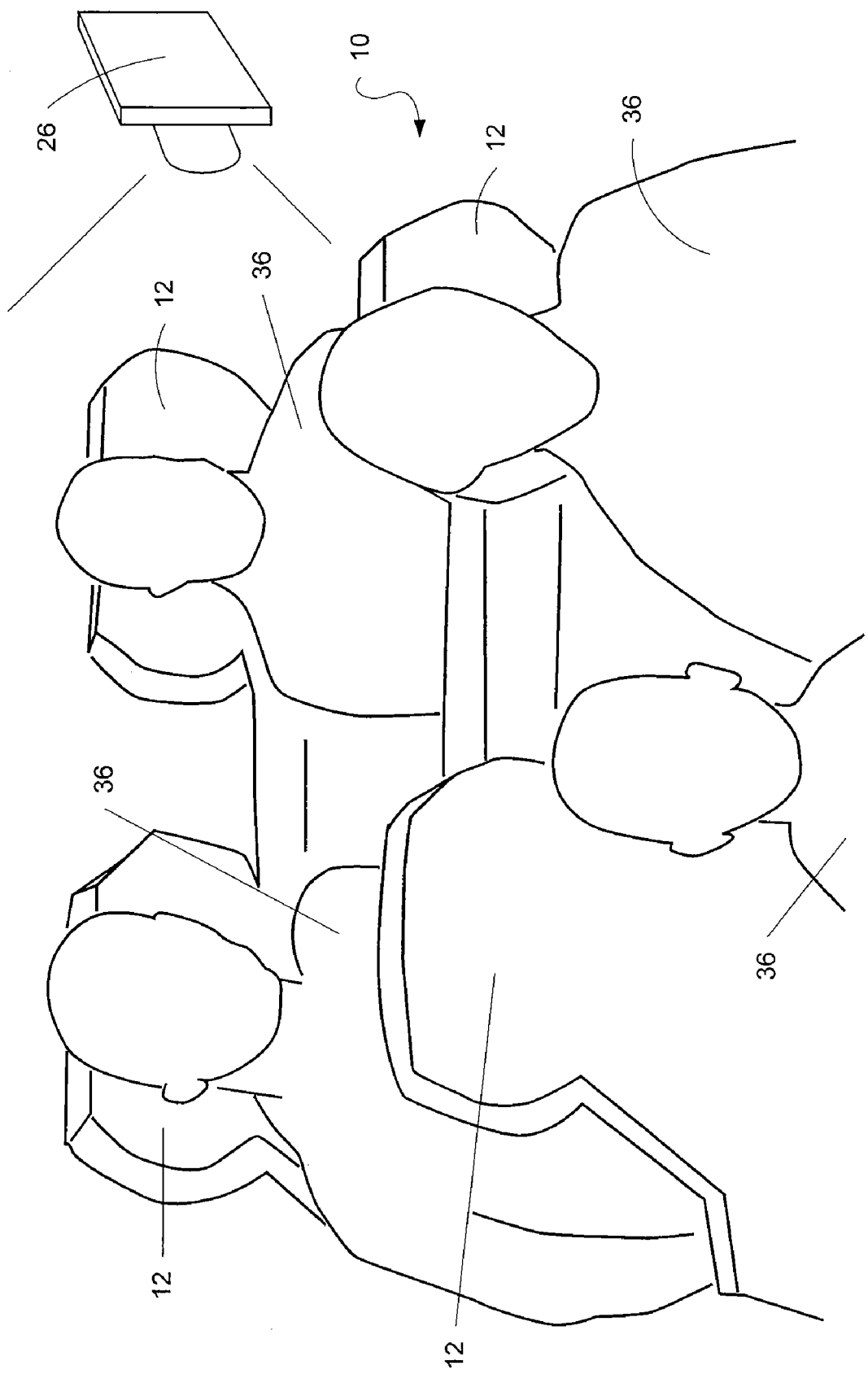
FIG. 5 is a partial front perspective view of a ride vehicle of FIG. 2 including a plurality of guests and showing an image capture device arranged to capture an image.

The attraction shown in FIG. 5 includes at least one guest interaction device 28, namely a ride vehicle 10 which may be configured to seat one or more guests. More specifically, an amusement park ride, and in particular, a single car or vehicle 10 in an amusement park ride may be provided. The amusement park ride may be a moving vehicle, and include rows of seating. Each row of seating, for purposes of this example, may include two (2) guests or people (regardless of the number of available seats 12 in the row), and each vehicle may include two (2) rows of seating (see FIG. 4). Accordingly, a ride vehicle 10 is provided which may be occupied by one or more guests 36. In the example shown in FIGS. 1, 2 & 4, the ride vehicle 10 may be occupied by anywhere from zero (0) to six (6) guests, including three (3) guests in each row, and is specifically illustrated in FIG. 5 with two (2) guests in each row. While specific examples are given, one of skill in the art would understand that any number of cars 10, seats 12, rows, guests 36 may be used without departing from the overall scope of the present invention. Likewise, while a moving vehicle in an amusement park ride is specifically described in this example, the principals of the invention can be applied in other arrangements and to other devices. Each guest interaction device 28, or ride vehicle 10, may include at least one computing device 14 with a display 16 configured to display customized media on the display 16 comprising a stock media altered to include the captured guest image. The attraction also may include an imaging device 26 or a plurality of imaging devices positioned to capture at least one image of one or more guests. For purposes of this example, the display and computer may be provided with a touch screen user interface 34. The touch screen user interface 34 is provided with a plurality of control options permitting the user or guest to customize or personalize his or her experience. In an example of an embodiment of the present invention, the touch screen is provided with one or more choices or options 38, 40, 42, 44 for a guest (see FIG. 4) in response to a query or request or regarding particular subject 46. Any choice may be suitable for the purposes provided. The guest may, for example, be asked to select a language within which to communicate. The guest may also be asked where he or she is from, by for example, requesting that the guest key in relative information or alternatively, by asking the guest to select and zoom into a location on a map. The options are collected as guest input data by the system.

In addition to the collection of information or data from each guest, the system may obtain one or more images of each guest. As illustrated in FIGS. 3 and 5-9, an image capture device 26 may be used to capture an image or more than one image of a guest. The image capture device 26 communicates with the image capture computer system 18 which may control the image capture device 26.

An image, such as but not limited to, a photograph or picture may be taken of the guest, manually or by automated means. An image may also be taken of the entire ride vehicle 10 with guest or guests 36 therein. The entire ride vehicle image or raw image may form a scene image. The image may also be taken of the guests alone, or portions of the guests. In an example shown in FIG. 4, four guests are seated in the car and are instructed to look at a display. In this regard, a device or other mechanism may be used to attract the attention of the guest so as to obtain the image with the guest in a certain position. For instance, an additional camera (not shown), such as a video camera, may be provided in association with the display to provide a real time image of the guest in the display. The image capture device 26 may then be used to obtain an image of each guest in the ride vehicle 10. The image capture device 26 may capture an image of all seated occupants in the vehicle simultaneously. In other words, at least one image may be obtained including all guests or riders in the ride vehicle 10, forming a raw image or scene image. The scene image and the extracted image may be communicated or transferred to the object finding server 20. Using object finding, the object finding server 20 may review or query the scene image for one or more portions of each guest, and more specifically, for one or more identifiable portions of each guest.

In the method and system described herein, object finding, such as but not limited to face finding and biometrics, may be used to obtain an image of a person, such as an identifiable portion of a person or guest. The system may review the captured image for guest faces which may correspond to a desired image to be extracted. For example, in a scene image, the system and method must first locate the identifiable portion of the person or guest before extraction of that portion can occur. Object recognition may also be used. As indicated, the method and system includes or comprises extracting at least one image of a portion of a person from a scene image. Extraction may be based on object finding or object recognition. More specifically, the operation of extracting may include extracting at least one facial image associated with an image of a portion of a person from the scene image. The recognized or identified extracted image may then be linked or otherwise tagged for use in association with the scene image. While two images are specifically described, which may be taken from one, two or more image capture devices 26, additional images of a guest may also be obtained and used. Additionally, in some instances, the operation of extracting an image may include extracting an at least partially obscured image of a portion of a person from the scene image. This obscured image, or any image obtained by the image capture device 26 may be altered or otherwise manipulated or modified.

In an alternative embodiment, the image capture computer may transmit the scene image to a remote computer, which may be an object finding server 20 or other system. At the remote computer, at least one image of a portion of the guest is extracted from the scene image based on object finding.

In the example described herein, a scene image is obtained of the guests in FIG. 5 which includes obtaining a ride image of at least one guest in an amusement park ride car. At least one image of a portion of the guest is extracted from the ride image based on object finding. The portion of a guest may be a portion of a guest facial image. To this end, extracting the at least one guest facial image from the scene image may be based on face finding. Generally, object finding, or more specifically face finding, may be performed by a computer application that automatically identifies or verifies an object, for example a person's face, from an image, such as a digital image or a video frame from a video source. These images generally are two dimensional. Face finding computer methods may be used identify faces by extracting landmarks, or features, from an image of the subject's face. For instance, a computer method may analyze the relative position, size, and/or shape of the eyes, nose, cheekbones, and jaw in a first image which may be an extracted image or a raw image. These features may then be used to search for other images with matching features. A computer method may also be used to normalize a gallery of face images and then compress the face data, saving or storing the data in an image that is useful for face detection. An image may then be compared with the face data. It is contemplated that three-dimensional object or face finding may also be used in which three-dimensional sensors are arranged to capture information about the shape of an object, namely the face. This information may then be used to identify distinctive features on the surface of, for example, the face, such as, but not limited to, the contour of the eye sockets, nose, and chin. Visual details of the skin, as captured in standard digital or scanned images, may also be used for object finding, which may make an identification on skin texture, such as but not limited to the unique lines, patterns, and spots apparent in a person's skin. Suitable object finding or face finding recognition software and products are commonly commercially available. For example, "faceAPI" is an object finding application available from Seeing Machines of Canberra, AUSTRALIA which runs on a computer system; "Face Sensing Engine" is an object finding application available from Oki Electric Industry Co., Ltd, of Tokyo, JAPAN arranged to run on a computer system; and "FaceIt ARGUT" is an object finding application which runs on a computer system and may be obtained from L-1 Identity Solutions, Inc. of Stamford, Conn. Alternatively, the object finding application may be custom generated to obtain the desired detection variables. The obtained or captured image of a portion of the guest may be further processed or cropped.

Figure 6:
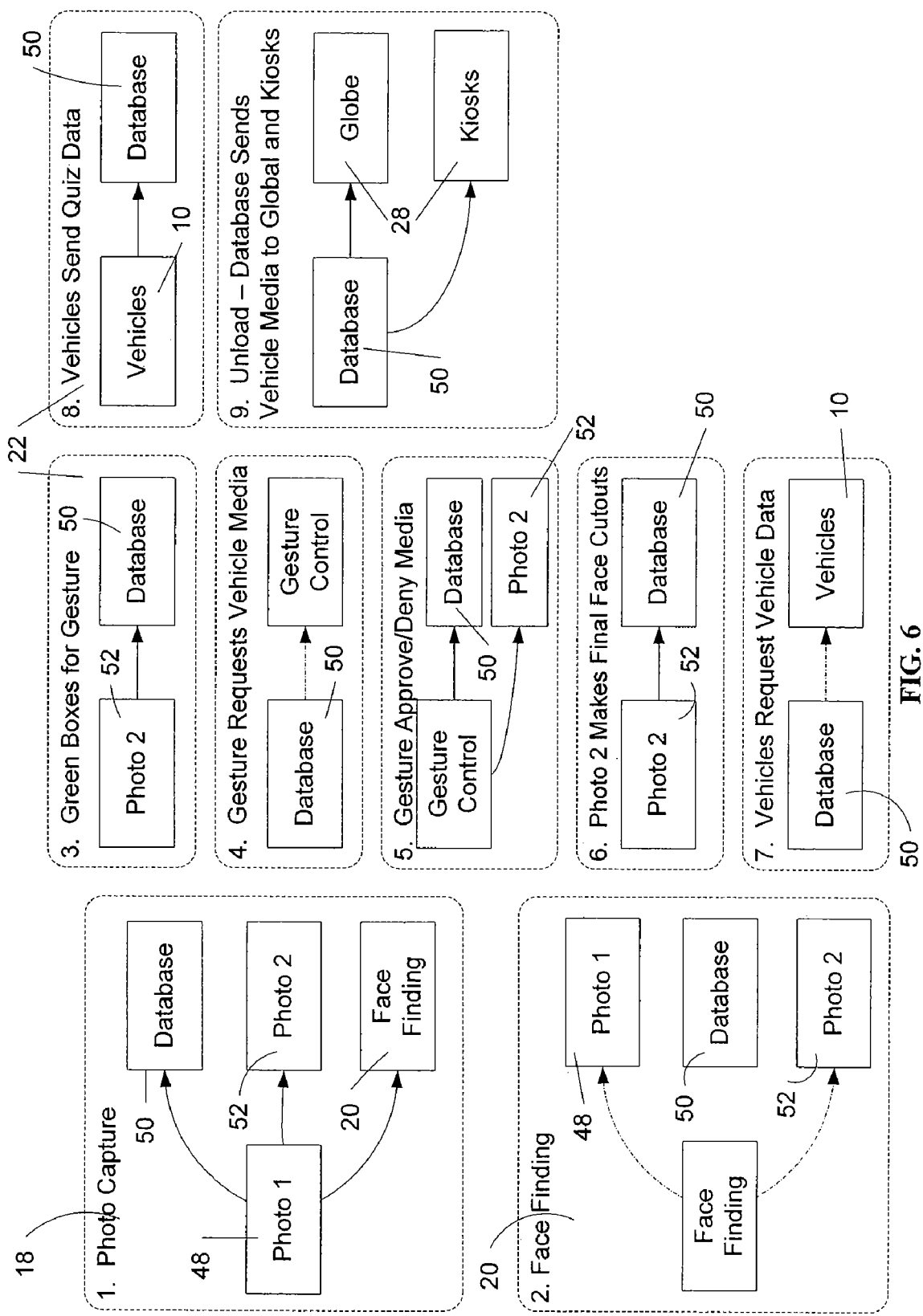
FIG. 6 is a flow chart showing a high-level overview of the process for customizing media.
Figure 7:
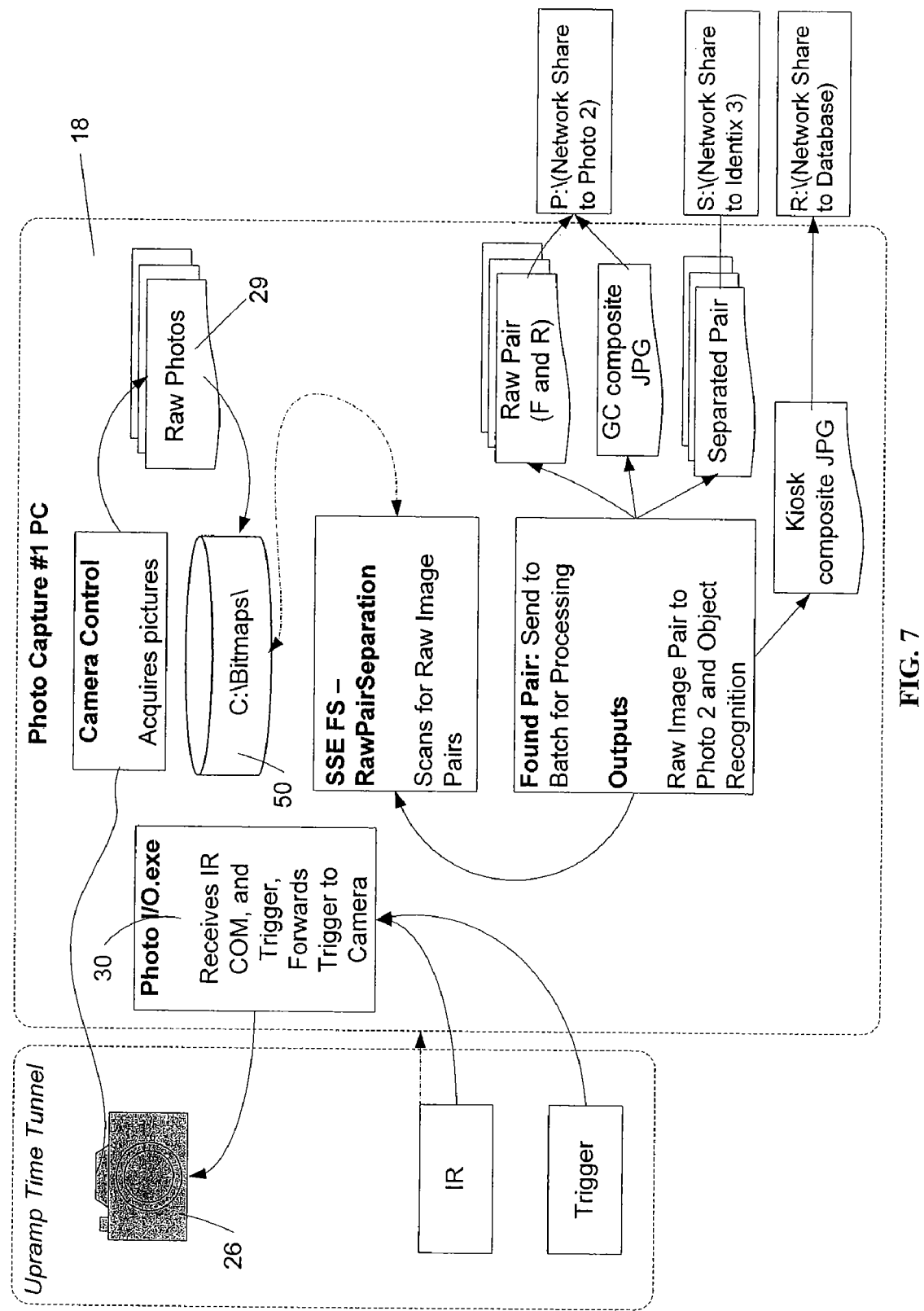
FIG. 7 is a flow chart illustrating an example of an image capture process according to one or more embodiments of the present invention.

Referring to FIGS. 5-7, for ease of explanation, the process will be described in reference to a single person or guest and single captured image, but a plurality of guests and images may be used as will be understood from the description. In the process shown in FIGS. 5 & 6, an image capture computer 18 captures the image of a person or guest. This may be done by, for example, capture of a photograph. The photographic file 48 which may include the raw image 29 may be transferred or communicated or pushed to a database 50 in communication with the image capture device 26. A raw image, or plurality of images, are transferred to a database or server in communication with the image capture computer system. The image is then processed. The photographic file may be processed so as to extract a second photographic file 52 of the guest. It is further contemplated that a computer method may analyze the relative position, size, and/or shape of the eyes, nose, cheekbones, and jaw in a first image which may be an extracted image or a raw image. These features may then be used to search for other images with matching features. A computer method may also be used to normalize a gallery of face images and then compress the face data, saving or storing the data in an image that is useful for face detection. More specifically, the database may query or scan the raw image files for one or more images. For example, the database may query for a raw vehicle file, and one or more images, and more specifically, two images of a ride vehicle, such as an image of a front row of a ride vehicle and an image of a back row of a ride vehicle. It is also contemplated that two images of a guest, such as a front and a rear image may be used. Upon locating the queried images or acceptable images, the located images are sent to batch for processing. Processing may include combining the images to form a complete image or what appears to be a complete image. For example, an image from the front row of a ride vehicle may be combined with an image of a back row of a ride vehicle to form a complete ride image.

The processed images may be returned in response to the database query. An object finding server 20, such as but not limited to a face finding server, then may process the image files of the guest. The step of processing may include sending the image for comparison to an object recognition server and database. The raw images, composite images, and separated processed images may be transferred by the image capture computer system 18 through a network to various interconnected systems. For example, the network may be used to transfer the images to a second computer system such as a network server 22, an object finding database or server, an object recognition database or server, and/or a storage or image sharing database. An image file, such as the first photographic image file 48 may therefore be pushed to a database 50.

Figure 8:
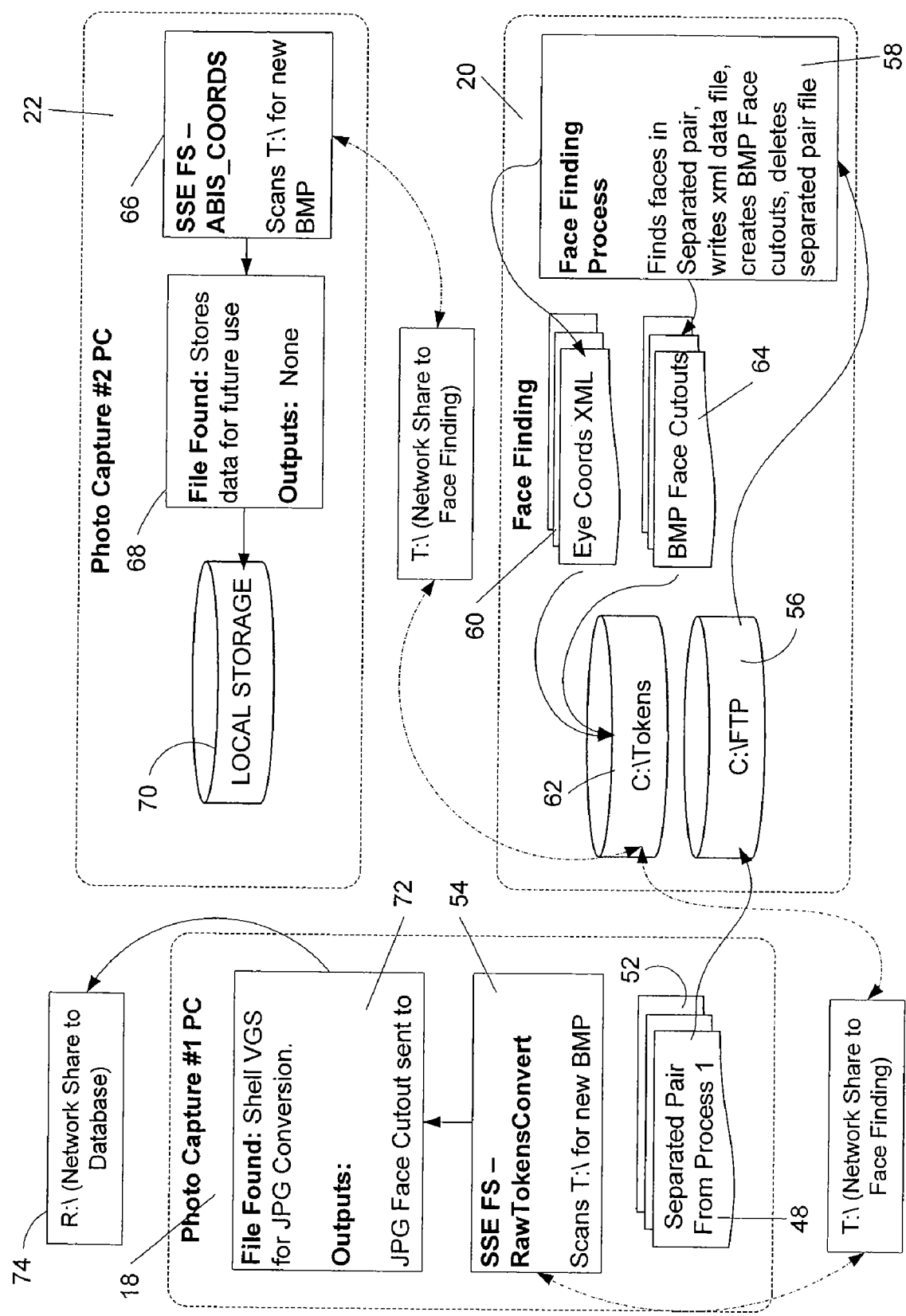
FIG. 8 is a flow chart illustrating an example of an object finding process according to one or more embodiments of the present invention.

As can be seen in FIG. 8, the object finding process may occur on the object finding server 20 and may begin when one or more images 48, 52 are received from the image capture computer 18. In one example of an embodiment, object recognition may be used in which the image capture computer system 18 may obtain the raw images previously retrieved 54 by querying the image 48 in comparison in the object recognition database. More specifically, a pair of separated images 48, 52 may be captured by the image capture device 26. Using a file transfer protocol 56, or other acceptable protocol, the separated pair of images may be transferred from the image capture computer system 18 to the object finding database 20 for processing. The object finding process 58 includes locating identifiable portions of a guest in each image, such as faces in each image, and may also include locating such images in a separated pair or plurality of images of the guest. In one example, object finding may include object recognition which may compare an image of an identifiable portion of a guest, such as the guest's face, to a raw image including the guest, such as an image of a ride vehicle 10 including a plurality of guests. The object finding server 20 may then record or otherwise note a matching image for later use by the system, namely for returning to a media object for display to the guest.

The object finding system may also compare and record image coordinates 60 of each guest. For example, eye coordinates may be obtained. The image coordinates may be transferred to, in one example, a token database 62. The object finding server 20 also may in any combination write one or more data files, such as an XML data file, create one or more BMP identifiable image cutouts, and/or delete one or more separated image files. The BMP identifiable image cutouts 64 may then be transferred to the token database 62. While tokens and XML markup language are specifically identified, alternatives would not depart from the overall scope of the present invention. Likewise, while BMP or bit-mapped graphics format, as commonly used in the Windows environment, is specifically referenced herein by way of example, alternative format graphics files may be acceptable for purposes of the present invention.

The image capture computer system 18 and object finding server 20 may communicate with a second system, namely, a network server 22, in operable communication therewith. Specifically, the information and data obtained by the image capture computer system 18 and the object finding server 20 may be transferred or communicated to the second system or network server 22. For example, the first system may transfer the data, an image of a ride vehicle 10, the ride vehicle 10 identification, the time stamp, and any other applicable metadata, along with the cut out or extracted portion(s) of the guest(s) to the second system. In a further example, the system may also transfer the image of the ride vehicle 10 separately.

The raw tokens 62 may be queried by the image capture computer system 18 via the network, and may be scanned for new BMP images. The image coordinates may also be queried by the network server 22 in communication with the object finding server 20. The network server 22 may receive image coordinates and may also scan for new BMP images 66. Upon locating the queried file, the network server 22 system may store the data for future use 68 in a local storage system or database 70. The located image file may also be converted into an acceptable format for use in processing in the system, such as for example, conversion into a JPG format file 72. The image file is processed, or more specifically, may be further cropped or cutout for use. The cutout, formatted image is then output via the network to a database 74. Again, while specific file formats, such as BMP and JPG, are discussed by way of example, alternatives would not depart from the overall scope of the present invention.

Referring again to FIG. 6, an image file, such as the second photograph image file 52, may be analyzed to verify the image is acceptable for display in connection with a media object. This may be done by manual or automated means. To this end, the second image file may be pushed or communicated or transferred to the database 50. Media may then be requested by the system, and in particular the database for review and approval. The system may approve or deny the media for use with the image. If the media is approved, the approved file is pushed to the database. As shown in FIG. 8, the network server 22 system, in receipt of the images and data from the image capture computer system 18 and the object finding server 20, may receive data from an additional system in communication with the network server 22 system. For example, an analysis system 76 may be used to review or analyze images to verify the image, or plurality of images, is appropriate for display. The analysis system 76, in one example, may generate or deliver a report, such as an XML censor report 78 regarding each image. While XML markup language is specifically described, XML is identified for purposes of example only and other suitable languages would be acceptable for the purposes provided. This data is transferred to local storage 70 in communication with the network server 22 or computer system.

Any one of the images, or cropped images, may be reviewed, by manual or automated means, to determine if all relevant portions of the guest are captured and/or for any additional unwanted or inappropriate images. For example, the image may be a partially obscured image. The image may be reviewed and each face in the image may be encircled, for instance, by drawing a box around the face, and a token may be associated with each face, such as coordinates of a particular portion of the image. Likewise, an image of a ride vehicle 10 may include a plurality of guests. The vehicle image or raw image may be reviewed to determine if all occupants have been captured in the scene image, such as for instance, four people are present in the car, but only three faces are captured. The flawed or partially obscured image may be "touched" manually, or by automated means, to add any missing portion of an image. The cropped image is transferred or pushed to the database. Alternative systems may also be used for editing or otherwise modifying the image, whether manual or automatic, without departing from the overall scope of the present invention.

Any of the image files, image coordinates, and the data associated with the guest or guest interaction device 28 for the particular guest from the processes described may be transferred into local storage 70. The guest interaction device 28 may send guest information obtained from guest input, such as responses to inquiries, to a database that may later unload or push the information collected and media to a display. Portions of each guest may be removed or cut or modified, or otherwise extracted from the scene image using software executed by the image capture computer. Upon receipt of the images and data, the network server 22 system may also edit or clean the image. Upon locating the queried portion of the guest, the system may further cut or crop the portion of the image. For example, the image may be cropped to include a specific portion of the guest, or to remove unwanted background. As one example, a rectangular image of a person's head formed by extraction from a raw image from an image capture computer system 18 may be cropped to shape the specific features, i.e., face, hair, ears, apparel, accessories and so forth. More specifically, the method may include cropping at least one facial image along a boundary of the facial image. This editing process or operation may be automated or manual.

In one example of an embodiment, a virtual green screen may be used to obtain an image for use with the system. A ride vehicle having multiple seat rows may be used. Accordingly, a ride image is captured. More specifically, a computer system executing software is in communication with one or more image capture devices and may control the capture of an image. The ride image is captured by obtaining a plurality of closely timed separate images, such as closely timed separate photographs by the one or more image capture devices. In one example, two rows may be provided in a ride vehicle. Accordingly, two closely timed separate photos may be captured by an image capture device. Additional rows and images may be obtained without departing from the overall scope of the present invention. In addition to closely timed multiple image capture, focused and directed lighting may be provided on each row to obtain a suitable image with the image capture device.

An individual photo is then created for each seat row from the raw image by the computer system that shows only the guests in that row, with all of the background and foreground removed from around the guests as if they had been photographed in front of a chroma-key "green screen". The process does not require a green screen background behind the guests, as the raw image may be used by the system. In other words, the image captured of the ride vehicle is transformed by the system into an individual row and more specifically guests in that row absent any background or foreground material. The process may create the row image even when the background includes a row of guests sitting in the next seat row, and may also remove the foreground from the raw image, even when the foreground includes a row of guests sitting in front of the guests being photographed. This permits use of images of only the guest's seat row, or guests in a particular row in a vehicle. As a result, the images may be used to personalize and customize a ride for a guest, avoiding the inclusion of guests in other rows of the ride vehicle in a media object created for the guest.

Figure 9:
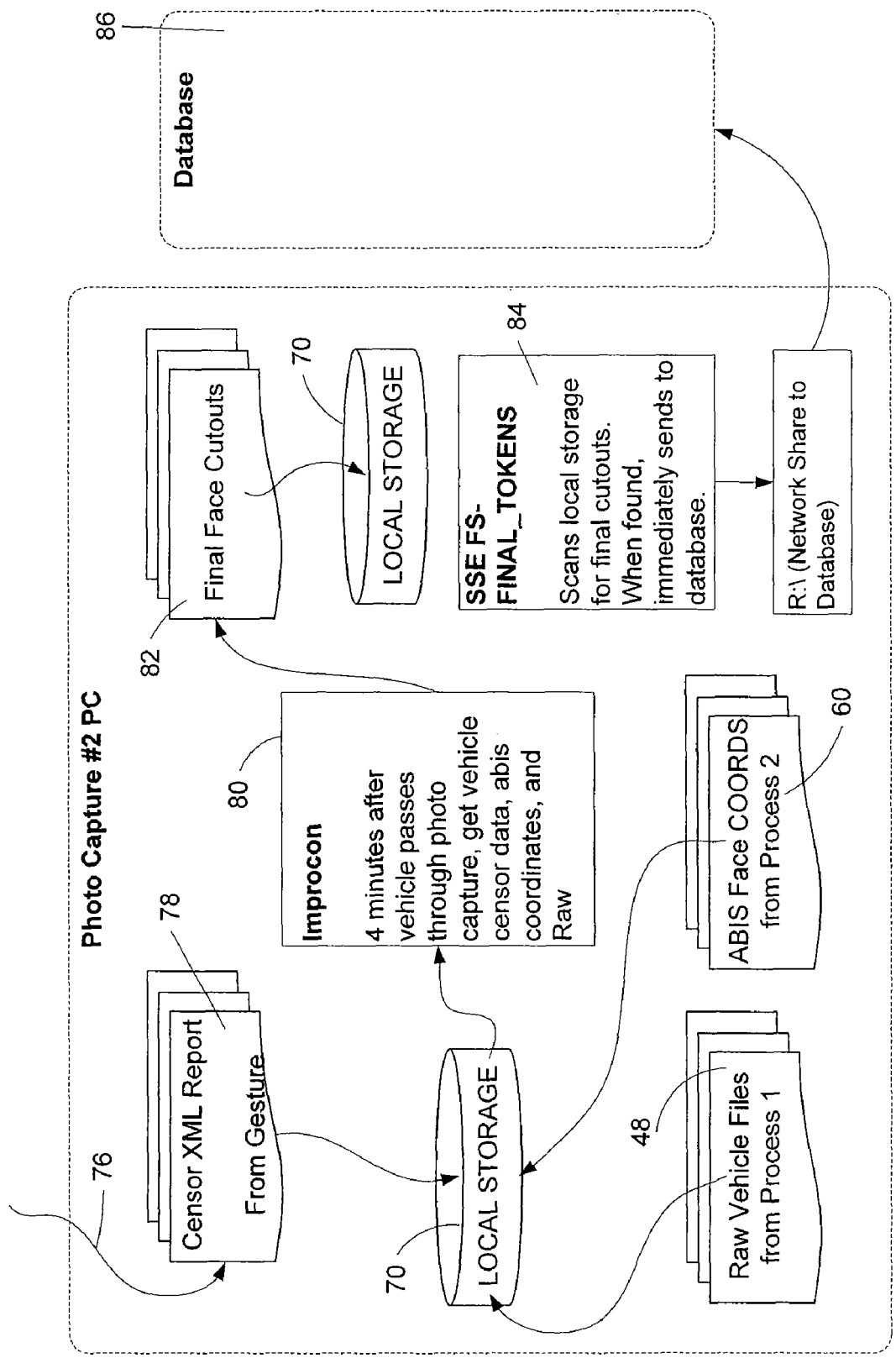
FIG. 9 is a flow chart illustrating an example of an image processing process according to one or more embodiments of the present invention.

Referring to FIG. 9, after a predetermined period of time following the triggering of image capture, the network server 22 system may obtain certain data from local storage 80, including for example, the raw image file, the censor data, the image coordinates, and the raw images. This information may be matched or linked to the final identifiable image including guest cutouts or extracted images 82, and transferred or returned to a local storage system 70, which system may be an additional database or the same database previously described. The network server 22 system may scan the local storage system 84 for final cutouts or extractions and when found, send the images to a media server or database 86 for display. The system 22 may also request guest interaction device data, such as but not limited to device identification information, from the database.

At the end of the foregoing processes, the network server 22 system may possess or house within its storage system the ride or guest interaction device 28, the image of the identifiable portions of the guests and the metadata associated with each of the guests. This data is stored on a database in operable communication with the network server 22 system. The image of the identifiable portions and the metadata may then be passed or communicated to the ride vehicle 10 from the network server 22 system. In particular, this information may be communicated from the network computer system 22 to the computer system 14 located on the ride vehicle 10.

Once the image or images and metadata are received, the information may be placed in a system folder for playback. More specifically, the ride vehicle 10 computer or server 14 may drive one, two or more displays 16, configured to render or display customized media comprising a stock media altered to include the guest image. A portion of the media object may be stored on the media server 14. In one example, an animation portion of a media object such as a video is located on a media server in the vehicle. It is also contemplated that the stored portion or animation may be located on a server separate from the vehicle, such as but not limited to on the network server 22, and may be passed to the vehicle or vehicle computer via an acceptable communication device. For example, it may be acceptable to transfer or stream video with images to the ride vehicle 10 from a remote location. Thus, the media servers may, in one or more examples of an embodiment, be positioned "off-board" or remote from the ride vehicle 10.

In the example discussed above in which the media server is located on or in the vehicle, a small amount of data is passed to the media server 14 located at the vehicle 10, namely metadata regarding the image and the image. In one or more embodiments, at least one of the images may also be matched or tagged with metadata related to the image, the person, or any other data suitable for use by the system. This may occur at any time during the course of the amusement park attraction.

Following extraction of the image, the image or a portion of a person may be inserted into a deliverable or video or other media to create a customized video or media, such as an animation, for a person. To this end, customized media including the at least one image of a portion of a person extracted from the scene image may be created.

In a further embodiment, the deliverable or video or media may be personalized by the guest to create personalized media specific to that person and including the image of a portion of that person.

To this end, in addition to, or as an alternative to the guest input described hereinabove, the guest or passenger or occupant may, during the attraction or at another time, use the user input device 34 associated with the on-board computer 16 to make a series of choices and provide additional input to the computer system. The information provided by the guest through the user interface 34 may be retained as data by the system, and may be used at any time in the process. In one example, the choices made are a series of responses to questions about the guest. There may be one (1), two (2), or more choices and may include, for instance, six (6) choices. These choices or options personalize a media object for the guest. The media object may also include one or more sub-elements within the options or selections. It is also contemplated that the guest may not enter selections or choices, or that options are not available to a guest.

In making choices, the user or guest provides additional data or input, stored as metadata, to the system. The media system and network system may therefore receive a selection of a particular stock media or generate or call up a particular stock media from a plurality of stock media, based upon guest selections. The stock media may be, for example, flash animations. As indicated, it is contemplated that no selections may be made by a guest. Upon receipt of answers to the foregoing questions or input from the guest, a media feature or element is created including one or more repeatable elements and one or more customizable elements. The same animation segment or stock media may be stored in the system, which may be the on-board computer or media server 14, for the car or the bicycle driving to the home. By choosing one segment over the other in a flash system, the user "jumps over" one animation segment and the animation begins with the second animation segment choice. The operation of generating customized media includes customizing the selected stock media to include the at least one image of a portion of the guest on a stock character of the selected stock media. The guest's image, which has been transferred to the media server, may be inserted into the animation. A media object may therefore be customized by including at least one cropped identifiable image of a person, such as a facial image. The customized media, which may include a stock animation with at least one character customized to include the cropped identifiable image of a person or facial image. More specifically, the customized media includes a stock media altered to include an identifiable portion of the guest and personalized to address or relate to the answers or input received from the guest in the various responses.

Figure 10:
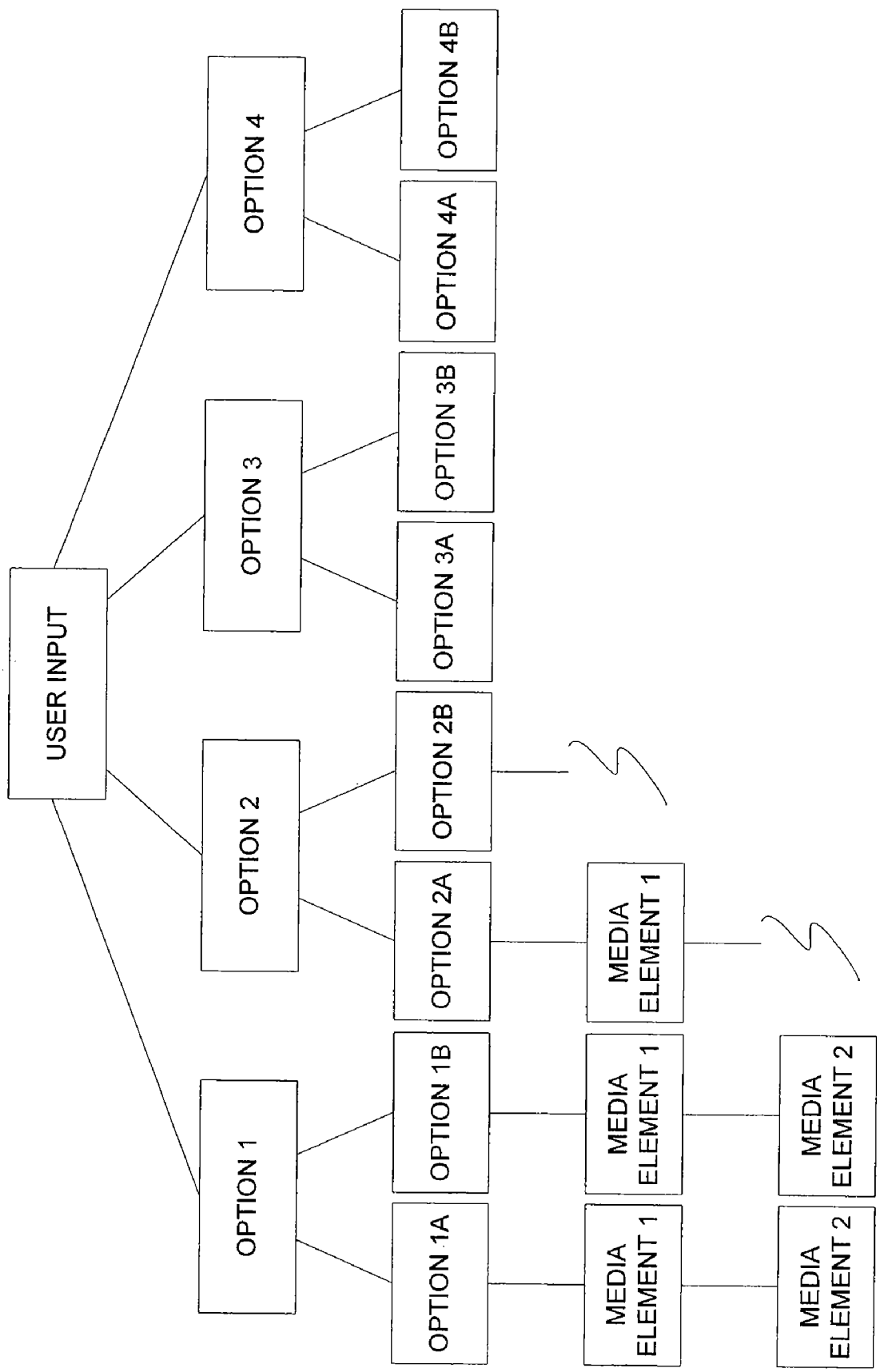
FIG. 10 is a chart illustrating a portion of a branching arrangement of stock media elements arranged in a partial tree structure.

A plurality of options may be provided in a branching arrangement. As shown in FIG. 10, the options provided to the guest form a branching arrangement, such as option 1, option 2, option 3, which further branch to form options 1A and 1B, options 2A and 2B and options 3A and 3B, respectively. For example, the options may be: "home, work, health or leisure". This may be presented to the guest in the form shown in FIG. 4. The selection made will determine which branch of options are available. For example, if the input or option is "home", then the options may follow: "a green home, a smart home, high-tech or high environment home, or a high touch home" Once the guest makes those choices, the branching may terminate. Once those options are selected, and the branch is determined, additional options or sub-elements may be available for selection. These additional selections are identified as media element 1 and media element 2 in FIG. 10. For example, if a guest selects a "home" and a "green home", then one or more additional options, which may be subject or topic related, may be presented, such as: "car pool or ride your bicycle." In an example of one embodiment, the first set of options may include one, two, three, four or more selection options, while the subsequent selection options in the branches may include two options or choices or questions. However, it is contemplated that any number of options or choices or questions and any number of branches may be used to customize a media object without departing from the overall scope of the present invention.

In making a selection, the guest is selecting a point. More specifically, the system may use flash animation to deliver video animation and/or segments thereof. The animation may, therefore, be provided in one or more flash frames or files. The guest may jump through frame numbers within a flash file based upon selections made and stored in the computer system. Thus, using the examples provided, the guest, based upon selections, may first jump to the home frame, then the guest may jump to the green home frame, then the guest may jump to the bicycle frame, then the guest may jump to a city or country choice (previously selected by the guest), and so forth. Any number of flash points and jumps may be used for purposes of the present invention, which are provided by the series of choices or selections made by the guest. Additionally, each flash point may be associated with one or more choices, for instance, two (2) choices, such as choice A and choice B. In one or more examples, each of choice A and B may also be provided with an identical number of frames. Thus, in a case in which multiple flash points or a series of choices are made, a user or guest may select a pattern of flash points in any combination, such as AAAA, or BBBBA, or AB or ABB, or BABA and so forth. In each case, a guest may jump to a specific frame number associated with a choice or selection. The flash animation may be combined in sequence to form a seamless animation. In addition, audio or an audio file may be synchronized with the frame selections to provide a seamless media, such as a movie. While specific subject matter is used to illustrate the foregoing and subsequent examples, the invention is not limited thereto, and any subject or options suitable for a particular use may be acceptable for use with the methods and systems described.

In the example provided above, while flash animation is described, the media object may be any suitable vehicle for display to or otherwise communicating with a guest, examples of which include, but are not limited to a movie, a video, an animation, a slide show or presentation, a static display or a combination of any of the foregoing. The media may also include any number of stock and customizable elements or components.

Inserting the extracted image of an identifiable portion of a guest into the personalized media object further enhances the personalization of the object. The image may be inserted by any suitable commercially available mechanism or may be done by execution of customized software designed to place an extracted image in a designated location in a media object, or may be done by manual operation. For example, the customized software may use coordinates on an image or defined in an image and align those coordinates with a location in a graphic. The software executed by the media server defines that the identifiable image of the guest, such as the guest's face, may be placed in a particular coordinate in the frame, such as an XY coordinate, which may be for instance the centerpiece of a guest's eyes which is positioned into an XY coordinate. This may occur in any form of media regardless of whether it is an animated movie or a static display.

Using the example provided, the media object would include an image of a person or guest riding a bicycle home from work to his or her green home in the country if "bicycle" was selected, or if "car pool" was selected, the same scene would show the individual returning home in a car filled with other people. In other words, the stock media object or animation scene, regardless of whether "bicycle" or "car pool" is chosen, may use the same number of frames and may include the same background elements which can be modified or rendered to include the extracted image. If the guest does not make a selection or a series of selections, a media object may still be created for the guest based upon, for example, a default setting using the stock media and an image or identifiable image of the guest.

As another example, the guest's face may be placed on or superimposed on the bicycle rider. Thus, the bicycle rider with the guest's face rides the bicycle to the green home in the example provided. As discussed, the selections made by the guest define the frames of the media or the stock media elements.

In the example provided above, in which flash animation is used, a movie is played by jumping from flash animations selected by the guest in the selection of options or choices. While flash animation is specifically described, systems or software such as DirectX and QuickTime or the like may be used to display/play a media object, such as an animation. For example, a static background may be used, and a frame is dropped into the background at a particular location. Alternatively, a plurality of movie or video clips may be provided in a storage system and adapted to be called up or streamed for play. For instance, one or more movie clips may be called up and linked or tagged together based upon user or guest selections and played back in sequence, thereby creating a movie. The media object when provided in the form of a movie or video may be a fixed length so as to accommodate a fixed length ride. However, variations therefrom would be acceptable for purposes of the present invention.

In an alternative embodiment, a single scene or stock media, rather than a plurality of flash animations or scenes, may be used and stored, such as a single background for a media clip, and the media server may be adapted to dynamically insert or call up the choice to be inserted, such as the bicycle or the car in the example provided. In this case, the guest image may be similarly placed or inserted into the scene, by placing the image, for example, on the bicycle or car. To illustrate this example, the guest's face may be plugged into the bicycle animation and the bicycle animation with face may be plugged into the background scene. Alternatively, the guest image may be placed into the scene after the bicycle or car is inserted.

The customized media may be transmitted to a computing device 14 positioned on the amusement park ride car 10, such as the computing device in communication with the display 16. Following transmission, the customized media is rendered on a display 16 positioned on the amusement park ride vehicle 10. The display may be based on the sequence of data associated with the at least one image of a portion of the guest.

The system may thus use the metadata and images collected, which may be stored in the server or media server either on-board the ride or off-board, and may generate the media object. Accordingly, in the example described hereinabove, the computer system 14 on-board the ride vehicle 10 may record the choices or input made by the guest. The choices or input may be then loaded into the form of a media object, such as but not limited to a movie or separate animation, than what may be available for display on the display screen. The media object then loads or forms based upon the choices made by the guest, including specific scenes. The media object is then played back to the guest.

A customized or personalized media object may be created for each guest in the same manner described above. In addition, a plurality of customized or personalized media objects may be driven by a single computer system, such as the on-board media server 14. Likewise, one or more customized media objects may be displayed simultaneously or in close temporal proximity. To this end, the system and components described herein are adapted to manage and execute programs for a plurality of customized media files, guest images, and guest metadata simultaneously or in close temporal relation. Each guest may be indexed or assigned an identification, for example, each guest may be identified in association with a ride vehicle or number. A sequence of data may be associated with at least one image of a portion of the guest sufficient to identify guest vehicle and seat location from a plurality of guest vehicle and seat locations. This sequence of data may also include or associate a time stamp or other time identifier with the image of a portion of the guest. The data passed to the off-board system or housed by the off-board system may be associated with the image of the guest, the corresponding ride vehicle 10, as well as the data or metadata associated therewith. Therefore, the network server system 22 or off-board system is capable of targeting or delivering a guest media object to a particular guest among a plurality of guests.

Upon reaching a segment of the attraction, such as the end of the amusement park ride, a communication may be made to the system to identify that a ride vehicle 10 has reached this segment, or is approaching this segment. For example, a mechanical or electronic trigger may be used to signal to the system that a specific vehicle (which may have a particular identification associated therewith) has reached the exit or is approaching the exit. In an example, upon receipt of the signal, a timer may determine the display of a media object.

The data or metadata and image, which was passed from the off-board system to the on-board system, may be passed back to the off-board system at or near the end of the attraction. The data may also already exists in the off-board system, and in particular in the database connected to or in communication with the vehicle computer system, and therefore not need to be re-passed off-board as the data or a copy thereof already exists in that system. In addition. Any additional choices or selections made by the guest may be transferred or communicated to the off-board system from the on-board computer system via the previously described mechanisms. This data may be passed at any time after the selection is made by the guest.

Following the triggering event, the image and metadata may be used and/or displayed by the system in an additional display (not shown). The metadata and image may be displayed in the form of a media object, such as a static display or video or movie. In a previously described example, a guest may have selected a location where they live which is input and retained as metadata. This metadata may be used, then, to display the guest's image on a location of a map in this location. The image may be the same image that was used to create the media object displayed on the guest interaction device 28, such as in the form of a movie, or may be a different image of the guest.

In addition, one or more kiosks (not shown) may be available for use by a guest. Each kiosk may be adapted for object recognition, such as recognition of an identifiable portion of a guest. The identifiable portion may be the same portion as used previously by the image capture computer system 18, or may be a separate image. The kiosk may, thus, recognize the guest based upon the earlier image obtained of the guest during a portion of the ride. To this end, the kiosk may be provided with an image capture device 26 and, in one example, may retrieve or obtain an additional image of the guest, such as by obtaining a picture. Object recognition may be accomplished, in one example, by comparing selected facial features from the image and a facial database. Object recognition may be used to compare two or more images to locate identifiable portions. One image may be a scene image. An additional image may be obtained from, for instance, a scene image including at least one image of a portion of a person. The new image obtained by the kiosk camera may be compared to an image retained in the system from the earlier ride image, and/or compared to other images of people or guests who have been on or exited a ride. In one example, the system may use a defined or discrete time period and review images of individuals within that time period. Likewise, the system may limit variables by limiting the images it reviews to those only associated with a particular ride. An image may then be compared with the face data. Suitable recognition computer methods include eigenface, fisherface, the Hidden Markov model neuronal motivated dynamic link matching and others. It is contemplated that three-dimensional object or face recognition may also be used in which three-dimensional sensors are arranged to capture information about the shape of an object, namely the face. This information may then be used to identify distinctive features on the surface of, for example, the face, such as, but not limited to, the contour of the eye sockets, nose, and chin. Visual details of the skin, as captured in standard digital or scanned images, may also be used for object recognition, which may make an identification on skin texture, such as but not limited to the unique lines, patterns, and spots apparent in a person's skin. Suitable object recognition or facial recognition software and products may be obtained from L-1 Identity Solutions, Inc. of Stamford, Conn. Other means and devices for object recognition may be used without departing from the overall scope of the present invention.

Once the image is located, in some instances, the guest may be asked to confirm the image is correct. In an alternative example, a system or kiosk may provide the guest with a plurality of image choices and request that a guest make a selection of image choices. The guest may also be queried regarding the one or more selections made during the attraction. The image of the guest in the media chosen may be displayed for the guest on the kiosk or on a separate display.

The kiosk may be adapted to obtain user input from the guest. For example, the kiosk may display one or more options, such as but not limited to a series of questions, for the guest. Any number of inquiries or options may be suitable for the purposes provided. In one example, the kiosk may request that the guest select a language. The kiosk may be adapted to query the guest, and/or obtain an order or obtain a request, or otherwise create a media piece, such as a post card or a picture or video/movie of the guest's experience. The media piece may be created or generated from the media object that was created during the course of the ride and which may have been viewed by the guest. A media piece, if selected, may be created in close temporal proximity to the guest's visit to the kiosk, or may be created at a later date and sent to the guest at a particular location. The media piece may be a static media element, such as but not limited to a picture or post card, or may be a motion picture, video, audio or other suitable media.

Accordingly, in the method and system described herein, an image may be obtained and displayed in or blended into the animation of a media object such as a movie or video, and may in addition be displayed in or blended into a static display. Each form of display may occur at any location in the attraction and on any form of display.

The method of the examples discussed herein may be automated, or may be partially automated, or may include any combination of automated and manual operation. Examples include, but are not limited to: the system may automatically detect the location of the guest, such as but not limited to, the ride vehicle 10 and the seat location of a seated guest; the system may also automatically capture an image of a guest, and in particular, an identifiable image of a guest; and the system may automatically generate a media object including said image.

As can be seen from the foregoing description of embodiments, the method and systems described herein provide a significant enhancement to the guest experience at an attraction. The foregoing system may be used to generate a personalized experience and a personalized media object for the guest, and may be done without obtaining any information from or about the guest. The system however, permits and provides a means for personalization by the guest through guest selections or choices made in association with the attraction and which are stored and used in association with an image of the guest. These selections or choices, as described, customize the media object for the guest. The resultant media object provides a personal connection to at least a portion of the ride by injecting a guest image and metadata related to the guest into a portion of the attraction. In addition, the method focuses the attention of the guest on the attraction, by requiring the input from the guest and generating a response or media including the guest. Moreover, the media object can be used to provide guest entertainment during, for example, transitions of the ride which may otherwise not maintain the attention of the guest.

The system herein used and described herein to customize media may include one or more components that may be operated by a computer or computer-executable instructions, such as program modules, executable on a computer. The computer may be a single computer or a plurality of computers. Program modules may include routines, programs, objects, components, data structures and the like which perform particular tasks or implement particular instructions. The computers for use in association with the system, method and various components described herein may be programmable computers which may be special purpose computers or a general purpose computers that execute the system according to the relevant instructions. Other computer system configurations may also be acceptable, including hand-held devices, cell phones, PDAs, mobile devices, multiprocessor systems, microprocessor-based or programmable electronics, network PC's, minicomputers, mainframe computers, and the like. The computing system may include a display or graphical user interface. The computing system chosen may include a processor suitable in size to efficiently operate one or more of the various systems or functions of the invention. To this end, the server and/or computer may be capable of efficiently and effectively handling the receipt, maintenance, and transfer of large data files. The system, computer, or portions thereof may also be linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof. Furthermore, the computer or computers may be operatively or functionally connected to one or more mass storage devices, such as, but not limited to a database. The system may also include computer-readable media which may include any computer readable media or medium that may be used to carry or store desired program code that may be accessed by a computer. Moreover, a means for converting data, media, images, and other files and information into digital or other machine readable format may be used.

Although various representative embodiments of this invention have been described above with a certain degree of particularity, those skilled in the art could make numerous alterations to the disclosed embodiments without departing from the spirit or scope of the inventive subject matter set forth in the specification and claims. For example, while the system and method herein are described in association with an amusement park attraction, the reference to an amusement park attraction is for purposes of explanation and illustration and is not intended to limit the overall scope of the present invention. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A method for customizing media comprising:
   obtaining from a first computing system a first image including at least one image of a portion of a person;
   extracting by a second computing system the at least one image of a portion of a person from the first image based on object finding;
   tagging the extracted at least one image of a portion of a person thereby associating it with the first image; and
   generating by a third computing system customized media including the tagged at least one image of a portion of a person extracted from the first image.

2. The method of claim 1 wherein the operation of extracting comprises extracting at least one facial image associated with the at least one image of a portion of a person from the image based on face finding.

3. The method of claim 2 further comprising cropping the at least one facial image along a boundary of the facial image.

4. The method of claim 3 wherein the operation of generating customized media includes generating customized media including the at least one cropped facial image.

5. The method of claim 4 wherein the customized media includes a stock animation with at least one character customized to include the at least one cropped facial image.

6. The method of claim 1 wherein the operation of extracting comprises extracting an at least partially obscured image of a portion of a person from the scene image.

7. The method of claim 1 further comprising altering the at least one cropped guest image.

8. The method of claim 1 wherein:
   the operation of obtaining an image comprises obtaining a ride image of at least one guest in an amusement park ride car;
   the operation of extracting comprises extracting the at least one image of a portion of the guest from the ride image based on object finding;
   cropping the at least one image of a portion of the guest; and
   the operation of generating customized media includes generating customized media including the at least one cropped image of a portion of the guest extracted from the at least one ride image.

9. The method of claim 8, wherein the at least one image of a portion of a guest comprises at least a portion of a guest facial image, the operation of extracting comprises extracting the at least one guest facial image from the image based on face finding, the operation of cropping comprises cropping the at least one guest facial image, and the operation of generating customized media comprises generating customized media including the at least one cropped guest facial image extracted from the at least one ride image.

10. The method of claim 8 further comprising:
    associating metadata with the at least one image of a portion of the guest.

11. The method of claim 8 further comprising:
    associating a sequence of data with the at least one image of a portion of the guest sufficient to identify a guest vehicle and seat location from a plurality of guest vehicle and seat locations.

12. The method of claim 11, wherein the operation of associating a sequence of data further comprises associating a time identifier with the at least one image of a portion of the guest.

13. The method of claim 11 further comprising:
    receiving a selection of a particular stock media from a plurality of stock media;
    wherein the operation of generating customized media includes customizing the selected stock media to include the at least one image of a portion of the guest on a stock character of the selected stock media.

14. The method of claim 13 further comprising:
    transmitting the image to a remote computer;
    at the remote computer, extracting the at least one image of a portion of the guest from the image based on object finding;
    cropping the at least one image of a portion of the guest;

generating customized media including the at least one cropped at least one image of a portion of the guest extracted from the at least one ride image;

displaying the customized media on a display positioned on the amusement park ride car based on the sequence of data associated with the at least one image of a portion of the guest.

15. The method of claim 14 further comprising:

transmitting the customized media to a computing device positioned on the amusement park ride car, the computing device in communication with the display.

16. The method of claim 1 further comprising:

obtaining a second image including a second portion of the person;

extracting the second portion of the person from the second image; and tagging the second portion of the person, thereby associating it with the first image.

17. The method of claim 16, wherein generating customized media comprises utilizing at least the tagged extracted at least one image of a portion of a person and the extracted second portion of the person.

18. The method of claim 1, wherein at least two of the first computer system, the second computer system and the third computer system comprise one computer system.

* * * * *